US 12,450,085 B2

United States Patent
Chander (10) Patent No.: US 12,450,085 B2
(45) Date of Patent: Oct. 21, 2025

(54) REQUESTING POWER MANAGEMENT METRICS FOR A PARALLEL ACCELERATED PROCESSOR FOR A VIRTUAL FUNCTION

(71) Applicant: ATI TECHNOLOGIES ULC, Markham (CA)

(72) Inventor: Vignesh Chander, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 498 days.

(21) Appl. No.: 17/957,521

(22) Filed: Sep. 30, 2022

(65) Prior Publication Data

US 2024/0111561 A1  Apr. 4, 2024

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45579* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 11,748,285 B1 * | 9/2023 | Haim | G06F 13/4282 710/305 |
| 2015/0378782 A1 * | 12/2015 | Hks | G06F 9/4887 718/103 |
| 2019/0018471 A1 * | 1/2019 | Chen | G06F 9/54 |
| 2022/0100543 A1 * | 3/2022 | Thomas | G06F 9/5027 |
| 2022/0197683 A1 * | 6/2022 | Potlapally | G06F 9/45558 |
| 2023/0125503 A1 * | 4/2023 | Cifuentes de la Paz | G06F 9/5077 718/104 |

* cited by examiner

*Primary Examiner* — Charlie Sun (57) ABSTRACT

A device includes one or more processors and one or more parallel accelerated processors. Additionally, a system management unit is configured to monitor the one or more parallel accelerated processors and to obtain one or more power management metrics for a parallel accelerated processor. A host driver included in the device is configured to receive a guest request for one or more power management metrics of the parallel accelerated processor from a virtual function of a virtual machine executing on the device, to transmit a host request for the one or more power management metrics from the host driver to the system management unit in response to receiving the guest request, to receive the one or more power management metrics from the system management unit at the host driver, and to transmit the one or more power management metrics from the host driver to the virtual machine.

20 Claims, 6 Drawing Sheets

REQUESTING POWER MANAGEMENT METRICS FOR A PARALLEL ACCELERATED PROCESSOR FOR A VIRTUAL FUNCTION

BACKGROUND

Virtual machines allow physical components of a computing system to be partitioned across multiple virtual environments, allowing each virtual environment to operate as if it has its own hardware, such as a processor. A virtual machine uses hardware components on a physical computing device to operate, with multiple virtual machines capable of sharing hardware components on a single physical computing device. While virtual machines are capable of using physical hardware, the physical computing device may restrict virtual machines from accessing information about operation of one or more hardware components.

DETAILED DESCRIPTION

Virtual machines allow physical components of a computing system to be partitioned across multiple virtual environments, allowing each virtual environment to operate as if it has dedicated physical components of the computing system. A virtual machine uses hardware components on a physical computing device to operate, with multiple virtual machines capable of sharing hardware components on a single physical computing device. The physical computing device includes one or more components that monitor operation of hardware components. For example, a system management unit in a physical computing device monitors operation of one or more hardware components of the physical computing device, such as power metrics for a processor or for a parallel accelerated processor that includes multiple cores configured to perform a common operation on multiple data items in parallel.

A hardware component of a physical computing device is partitioned into two types of functions when implementing one or more virtual machines. A physical function of a hardware component corresponds to the primary function of the hardware component, with the physical function having capability to configure the hardware component. In contrast, a virtual function represents a predefined allocation of physical resources of the hardware component, with a virtual function allocating physical resources of the hardware component to a virtual machine. This allows physical resources of a hardware component to be allocated to different virtual functions at different times. Thus, multiple virtual functions are capable of operating within a hardware component that is virtualized across multiple virtual machines. In such implementations, a scheduler tracks which virtual function is using the hardware component at different times. A virtual machine communicates with the hardware component through the virtual function, allowing the virtual machine to communicate directly with the virtual function as if the virtual function is the hardware component itself. Hence, different virtual functions may correspond to different hardware components, allowing different virtual functions to provide functionality of different hardware components to virtual machines. For example, virtual functions correspond to a network interface, a graphics processing unit (or other parallel accelerated processor), an input device, or other hardware component.

While multiple virtual machines may execute on a physical computing device, the physical computing device typically has a single system management unit. Conventionally, the system management unit is unable to ascertain which virtual function is using a hardware component. Additionally, to increase security of the physical computing device, virtual functions within virtual machines are prevented from directly accessing the system management unit, preventing a virtual machine from obtaining certain information describing operation of one or more hardware components, such as a parallel accelerated processor.

To that end, the present specification sets forth various implementations of host driver of a parallel accelerated processor obtaining one or more power management metrics for the parallel accelerated processor for a virtual function. In some implementations, a device includes one or more processors and one or more parallel accelerated processors. Additionally, a system management unit is configured to monitor the one or more parallel accelerated processors and to obtain one or more power management metrics for a parallel accelerated processor. A memory includes instructions that, when executed by a processor of the one or more processors, implement a host driver that is configured to receive a guest request for one or more power management metrics of the parallel accelerated processor from a virtual function of a virtual machine executing on the device, to transmit a host request for the one or more power management metrics from the host driver to the system management unit in response to receiving the guest request, to receive the one or more power management metrics from the system management unit at the host driver, and to transmit the one or more power management metrics from the host driver to the virtual machine.

In some implementations, the host request includes an identifier of the virtual function. The host driver determines the identifier of the virtual function from data included in the guest request in some implementations. In some implementations, the power management metrics are transmitted to the virtual machine identified by the identifier.

In some implementations, the host request is transmitted from the host driver to the system management unit in response to the host driver determining that the guest request satisfies one or more criteria. In some implementations, the one or more criteria include a type of the guest request not matching one or more specific types.

The present specification also describes a method that includes receiving a guest request for one or more power management metrics of a parallel accelerated processor from a virtual function of a virtual machine at a host driver of a computing device on which the virtual machine is executed. The method transmits a host request for the one or more power management metrics of the parallel accelerated processor from the host driver to a system management unit in response to receiving the guest request for the one or more power management metrics from the virtual machine. Additionally, the method receives the one or more power management metrics of the parallel accelerated processor from the system management unit at the host driver and transmits the one or more power management metrics of the parallel accelerated processor from the host driver to the virtual machine.

In some implementations, the host request includes an identifier of the virtual function. The host driver determines the identifier of the virtual function from data included in the guest request in some implementations. In other implementations, the host driver determines the identifier of the virtual function from data included in the guest request. In some implementations, the power management metrics are transmitted to the virtual machine identified by the identifier.

In some implementations, the host request is transmitted from the host driver to the system management unit in response to the host driver determining that the guest request satisfies one or more criteria. In some implementations, the one or more criteria include a type of the guest request not matching one or more specific types.

In some implementations, the one or more power management metrics comprise one or more current power management metrics of the parallel accelerated processor. The one or more power management metrics include one or more power management metrics for a currently active function being executed by the parallel accelerated processor in some implementations. In other implementations, the one or more power management metrics include one or more power management metrics for the virtual function.

In some implementations, the host request is transmitted from the host driver to the system management unit in response to the host driver determining that the guest request satisfies one or more criteria. In some implementations, the one or more criteria include a type of the guest request not matching one or more specific types.

The present specification also describes a computer program product comprising a non-transitory computer readable storage medium having instructions encoded thereon that, when executed by a processor, cause the processor to carry out steps including receiving a guest request for one or more power management metrics of a parallel accelerated processor from a virtual function of a virtual machine at a host driver of a computing device on which the virtual machine is executed. The steps further transmit a host request for the one or more power management metrics of the parallel accelerated processor from the host driver to a system management unit in response to receiving the guest request for the one or more power management metrics from the virtual machine. Additionally, the steps receive the one or more power management metrics of the parallel accelerated processor from the system management unit at the host driver and transmits the one or more power management metrics of the parallel accelerated processor from the host driver to the virtual machine.

Figure 1:
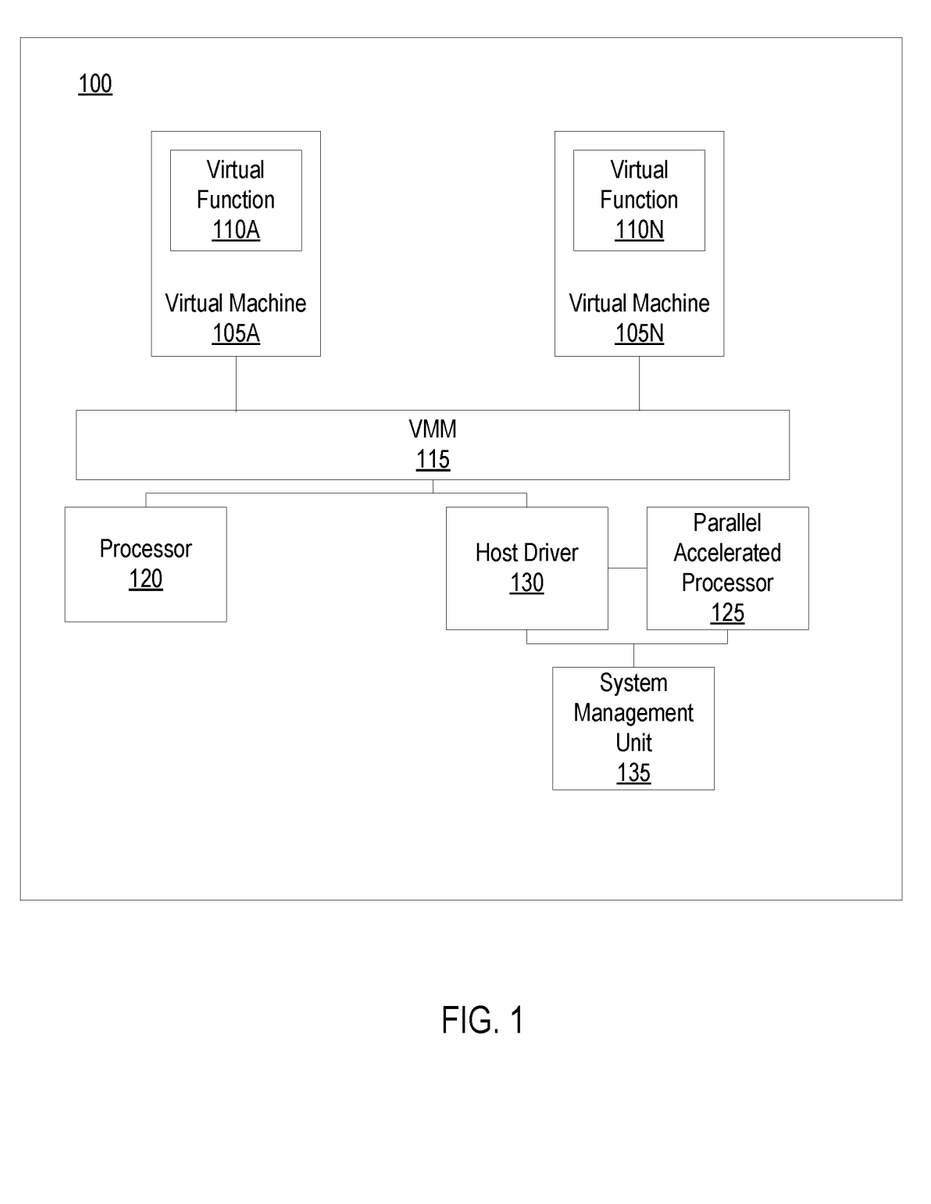
FIG. 1 is a block diagram of an example computing device according to some implementations.

Further, in some implementations, the host request for the one or more power management metrics of the parallel accelerated processor is transmitted from the host driver to a system management unit in response to the host driver determining the guest request satisfies one or more criteria. In some implementations, the one or more criteria include a type of the guest request not matching one or more specific types. In some implementations, the power management metrics are transmitted to the virtual machine identified by the identifier FIG. 1 is a block diagram of an example computing device 100. One or more virtual machines 105A-105N (also referred to individually and collectively using reference number 105) execute on the computing device 100. Different virtual machines 105 share hardware resources of the computing device 100, allowing different virtual machines 105 to operate as virtual computing systems using the hardware resources of the computing device 100. Different numbers of virtual machines 105 execute on the computing device 100 in different implementations.

Additionally, different virtual machines 105A-105N include a virtual function 110A-110N (also referred to individually and collectively using reference number 110) corresponding to a physical hardware component of the computing device 100. For example, a virtual function 110 corresponds to a parallel accelerated processor 125 of the computing device 100, while different virtual functions 110 correspond to different hardware components in various implementations. A virtual function 110 virtualizes the physical hardware component of the computing device 100 for use by a virtual machine 105 that includes the virtual function 110. In various implementations, a virtual function 110 passes requests and responses between a virtual machine 105 and the hardware component corresponding to the virtual function 110, allowing the virtual machine 105 to exchange information with the hardware component through the virtual function 110. In various embodiments, a virtual function 110 represents a predefined allocation of physical resources of a hardware component of the computing device 100 that corresponds to the virtual function 110. The virtual function 110 allocates physical resources of the hardware component to a virtual machine 105 having the virtual function 110. This allows physical resources of a hardware component to be allocated to different virtual machines 105 corresponding to different virtual functions 110 at different times. Thus, multiple virtual functions 110 are capable of operating within a hardware component that is virtualized across multiple virtual machines 105A-105N.

In various implementations, such as the implementation shown in FIG. 1, each virtual machine 105 communicates with a virtual machine monitor 115 (VMM), also referred to as a "hypervisor." The VMM 115 is software that creates and runs the one or more virtual machines 105 on the computing device 100. The VMM 115 allocates hardware components of the computing device 100 among the virtual machines 105A-105N. The VMM 115 provides an interface between a user or a guest using a virtual machine 105 and the physical hardware components of the computing device 100. In various implementations, the VMM 115 provides each virtual machine 105 the appearance of full control over a complete computer system (i.e., memory, central processing unit (CPU) and all peripheral devices). Different types of VMMs 115 may be used in different implementations. For example, a Type 1 (i.e., native) VMM is a standalone software program that executes on physical resources of the computing device 100 and provides the virtualization for one or more virtual machines 105, where a guest operating system of a virtual machine 105 executes on a level above the VMM 115. As another example, a Type 2 (i.e., hosted) VMM 115 is integrated into or executes on an operating system of the computing device 100, so the operating system components execute directly on physical hardware components and are not virtualized by the VMM 115. The VMM 115 is considered a distinct software layer and a guest operating system executes on a third software level above the hardware components and above the VMM 115 in some implementations.

The computing device 100 includes various hardware components that are used by one or more of the virtual machines 105. For purposes of illustration, FIG. 1 shows a processor 120 and a parallel accelerated processor 125 as example hardware components of the computing device 100. Other hardware components, such as a memory, a display device, one or more input/output devices, and a networking interface are not shown for clarity.

The processor 120 is a central processing unit (CPU) in various implementations. The processor 120 includes one or more cores for executing instructions. In various implementations, the processor 120 includes a cache memory or is coupled to a cache memory for retrieval of data used by the processor.

The parallel accelerated processor 125 similarly includes multiple cores for executing instructions, with the parallel accelerated processor 125 configured to process data in parallel through multiple cores. In various implementations, cores of the parallel accelerated processor 125 perform a common operation on multiple data items in parallel. For example, the parallel accelerated processor 125 is a graphics processing unit (GPU). However, in other implementations the parallel accelerated processor 125 includes cores configured to perform one or more operations for machine learning in parallel, one or more operations for cryptocurrency mining in parallel, or configured to perform one or more other specialized functions in parallel.

In various implementations, the parallel accelerated processor 125 is virtualized across multiple virtual machines 105A-105N through single-root input/output virtualization (SR-IOV) that executes a physical function corresponding to the parallel accelerated processor 125. The physical function is capable of configuring the parallel accelerated processor 125, rather than the virtual function 110 further described above that represents a predefined allocation of physical resources of the parallel accelerated processor 125 to a corresponding virtual machine 105. Additionally, the physical function of the parallel accelerated processor 125 manages communication between the parallel accelerated processor 125 and virtual functions 110A-11-N of different virtual machines 105A-105N.

The parallel accelerated processor 125 is capable of executing multiple virtual functions 110, with each virtual function 110 isolated from other virtual functions 110 executing on the parallel accelerated processor 125. Each virtual function 110 is associated with a unique identifier in various implementations, allowing a scheduler executing on the parallel accelerated processor 125 to track which operations performed by the parallel accelerated processor 125 correspond to which virtual function 110. Such a configuration allows a virtual machine 105 to securely communicate with the parallel accelerated processor 125 without affecting execution of virtual functions 110 from other virtual machines 105 by the parallel accelerated processor 125, while allowing a virtual machine to communicate with a corresponding virtual function 110 as if the virtual function 110 is the parallel accelerated processor 125 because of the communication between the virtual function 110 and the physical function (i.e., between the virtual function 110 and the parallel accelerated processor 125).

In various implementations, to implement SR-IOV, the parallel accelerated processor 125 includes a plurality of registers, with each register and corresponding memory allocated to a different virtual function 110. This allows the parallel accelerated processor 125 to present multiple instances of itself to the VMM 115 or to different virtual machines 105, with different instances of the parallel accelerated processor 125 corresponding to information stored in different registers of the parallel accelerated processor 125. Hence, the parallel accelerated processor 125 is capable of executing a number of virtual functions 110 based on a number of registers maintained by the parallel accelerated processor 125. For example, the parallel accelerated processor 125 includes 16 registers, allowing the parallel accelerated processor 125 to support execution of up to 16 virtual functions 110. When switching between execution of different virtual functions 110, the parallel accelerated processor 125 tracks information describing execution of a currently executed virtual function 110 and stores the information describing a context in which the currently executed virtual function 110 is executed when switching to executing a different virtual function 110. In various implementations, the scheduler executed by the parallel accelerated processor 125 determines when different virtual functions 110 are executed by the parallel accelerated processor 125, allowing the parallel accelerated processor 125 to perform virtual functions 110 for different virtual machines 105 at different times. As further described above, the parallel accelerated processor 125 maintains a unique identifier for each virtual function 110 to allow identification of different virtual functions 110, contexts in which different virtual functions 110 were executed, and scheduling of the parallel accelerated processor 125 to different virtual functions 110. Maintaining a unique identifier for each virtual function 110 allows for management of traffic streams from different virtual functions 110, such as by an input/output memory management unit of the computing device 100, and for application of memory and interrupt translations between virtual functions 110. Additionally, a unique identifier is maintained for the physical function of the parallel accelerated processor 125 to allow for management between traffic from the physical function and from virtual functions 110.

Figure 2:
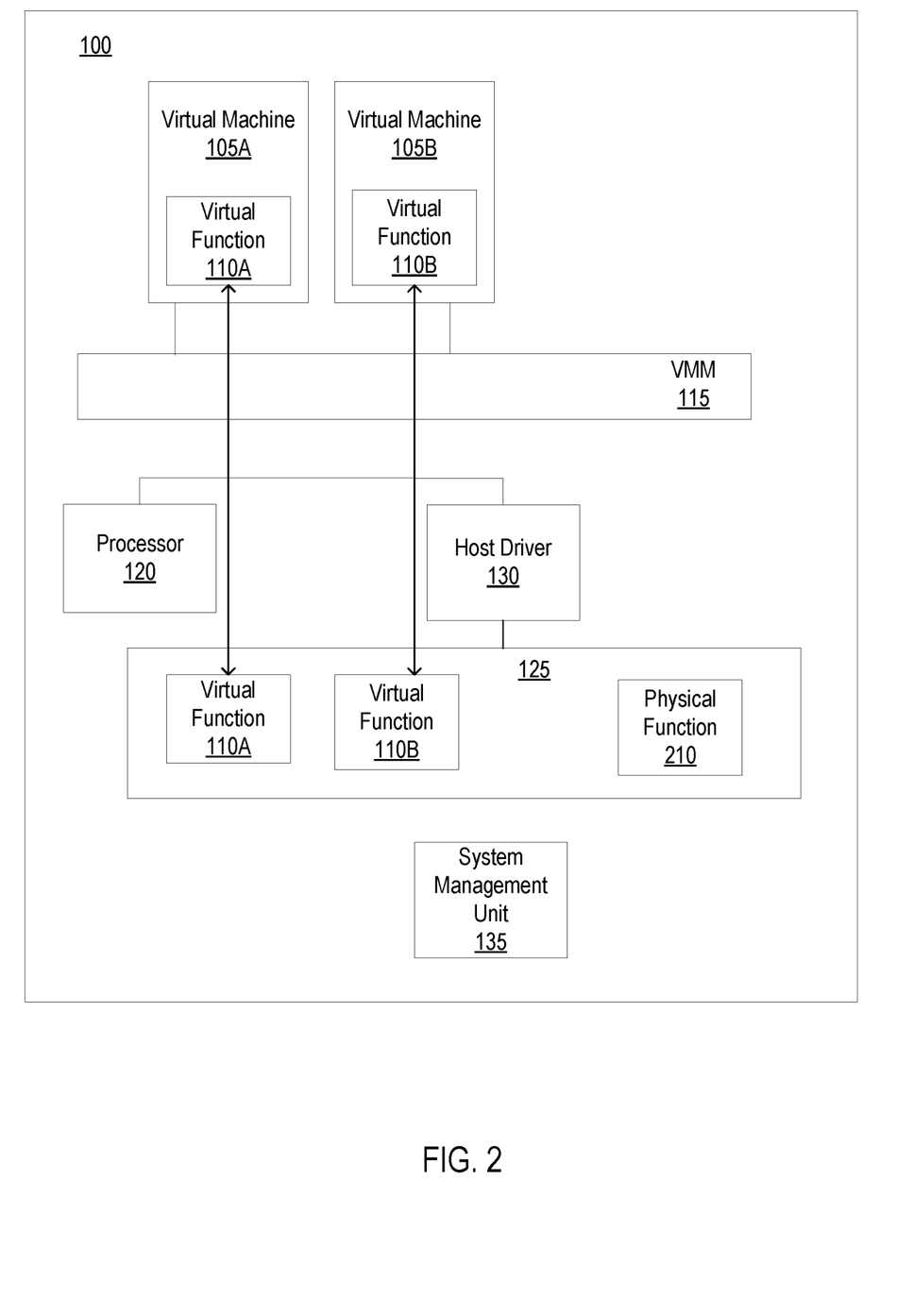
FIG. 2 shows an example virtualization of the parallel accelerated processor through single-root input/output virtualization according to some implementations.

FIG. 2 shows an example virtualization of the parallel accelerated processor 125 through single-root input/output virtualization (SR-MV). In a SR-IOV implementation, a single parallel accelerated processor 125 appears as multiple, separate, physical devices. The parallel accelerated processor 125 is configured to appear in a configuration space, such as a peripheral component interconnect (PCI) space as multiple virtual functions 110A, 110B.

In a SR-IOV implementation, a physical function 210 is the parallel accelerated processor 125. For example, the physical function 210 is a PCI device comprising the parallel accelerated processor 125. The physical function 210 is discovered, managed, and configured by the computing device 100 as a PCI device, or other type of device. The physical function 210 creates virtual functions 110A, 110B, which are mapped to virtual machines 105A, 105B by the WM 115.

Each virtual function 110A, 110B is a PCI function limited to processing input and output, with each virtual function 110A, 110B derived from the physical function 210. As further described above in conjunction with FIG. 1, hardware, such as a number of registers included in the parallel accelerated processor 125 typically determines a number of virtual functions 110A, 110B supported by the physical function 210. In other implementations, the allowable number of virtual functions 110 may be determined through software-based mechanisms. Hence, the physical function 210 is mapped to multiple virtual functions 110A, 110B.

Each virtual function 110A, 110B is mapped to a single virtual machine 105A, 105B, as shown in FIG. 2, because a virtual function 110A, 110B uses physical hardware resources of the parallel accelerated processor 125. The virtual function 110A, 110B appears to the virtual machine 105A, 105B to which the virtual function 110A, 110B in the same manner as the physical parallel accelerated processor 125 appears to an operating system.

Drivers for implementing SR-IOV for the parallel accelerated processor 125 are implemented in a kernel of the computing device 100. In various implementations, a memory of the computing device 100 includes instructions that, when executed by the processor 120, implement the host driver 130 for both the physical function 210 comprising the parallel accelerated processor 125 and the virtual instances of the parallel accelerated processor 125 corresponding to the virtual functions 110A, 110B. In various implementations, the host driver 130 is a component of an operating system executing on the computing device 100. For example, the host driver 130 is included in a kernel of an operating system executing on the computing device 100, with the kernel configuring communication between applications executing on the computing device 100 and devices, such as the processor 120 and the parallel accelerated processor 125, comprising the computing device 100. For example, the virtual functions 110A, 110B appear to their corresponding virtual machines 105A, 105B as PCI devices supported by corresponding hardware resources, such as registers or queues, of the parallel accelerated processor 125. The virtual functions 110A, 110B provide increased data protection between virtual machines 105A, 105B while providing near-native performance of the parallel accelerated processor 125 to virtual machines 105A, 105B.

Referring back to FIG. 1, A host driver 130 executes in the computing device 100, as further described above, enabling an operating system of the computing device 100 to communicate with a hardware component corresponding to the host driver 130. For purposes of illustration, FIG. 1 shows a host driver 130 corresponding to the parallel accelerated processor 125. Hence, the host driver 130 includes instructions for the operating system of the computing device 100 to exchange data with the parallel accelerated processor 125 in the example of FIG. 1. The computing device 100 includes other host drivers 130 corresponding to other hardware components of the computing device 100, which are not shown in FIG. 1 for clarity.

The computing device 100 also includes a system management unit 135 configured to monitor power management metrics of the parallel accelerated processor 125. In various implementations, the system management unit 135 is circuitry such as a microcontroller or a service processor configured to control power provided to one or more components of the computing device 100, such as the processor 120 and the parallel accelerated processor 125. In some implementations, the system management unit 135 provides instructions to a power supply of the computing device 100 or to one or more components of the computing device 100 to adjust power supplied to or consumed by one or more components of the computing device 100. The system management unit 135 monitors power management metrics of the processor 120 and of the parallel accelerated processor 125 in various implementations. Example power management metrics monitored by the system management unit 135 include a frequency of the parallel accelerated processor 125, an engine clock of the parallel accelerated processor 125, power usage of the parallel accelerated processor 125, a temperature of the parallel accelerated processor 125, a rate of utilization of the parallel accelerated processor 125, and other suitable information describing operation of the parallel accelerated processor 125.

Figure 3:
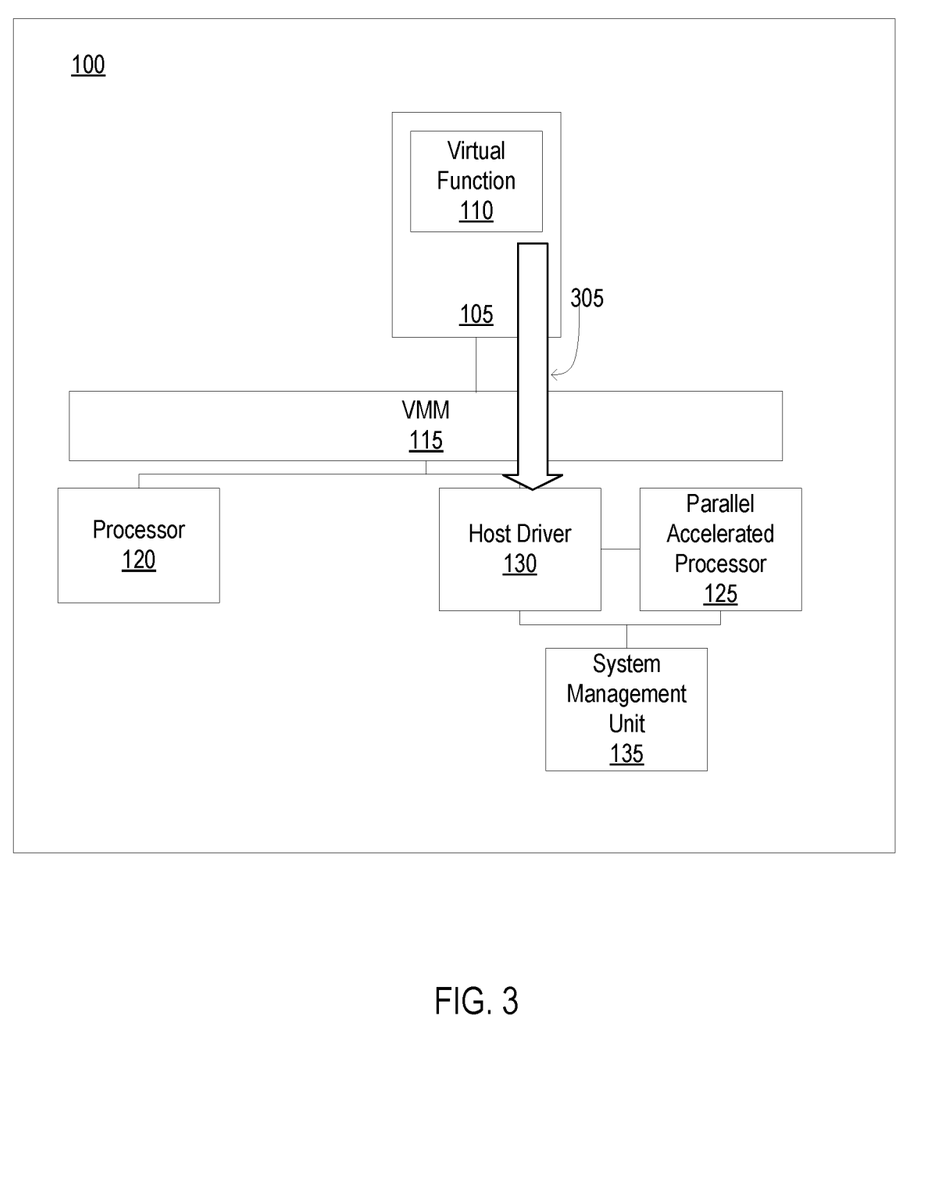
FIG. 3 is part of a process flow diagram of a virtual machine requesting one or more power management metrics of a parallel accelerated processor according to some implementations.

FIG. 3 is part of a process flow diagram of a virtual machine 105 requesting one or more power management metrics of a parallel accelerated processor 125. For purposes of illustration, FIG. 3 shows a single virtual machine 105 on a computing device 100; however, in other implementations, any number of virtual machines execute on the computing device 100. The virtual machine 105 transmits a guest request 305 to a host driver 130 for the parallel accelerated processor 125. In some implementations, the guest request 305 is generated by a virtual function executed by the virtual machine 105. For example, the guest request 305 is generated by a virtual function 110 for the parallel accelerated processor 125 executing in the virtual machine 105. The guest request 305 identifies one or more power management metrics for the virtual function 110 in various implementations. Additionally, in some implementations, the guest request 305 includes an identifier of the virtual function 110 requesting the one or more power management metrics or includes other information identifying the virtual function 110. For example, the guest request 305 includes an identifier of the virtual function 110 determined by the parallel accelerated processor 125 for allocating resources to the virtual function 110, as further described above in conjunction with FIG. 1. For example, the guest request includes a function number or a routing identifier corresponding to the virtual function 110.

In some implementations, the virtual function 110 of the virtual machine 105 transmits the guest request 305 to the host driver 130 without the virtual machine monitor 115 receiving the message or the virtual machine monitor intervening in transmission of the guest request 305. For example, in SR-IOV implementation, as further described above in conjunction with FIG. 1, the virtual function 110 is mapped to a register or other set of resources by the parallel accelerated processor 125, allowing the virtual function 110 to access the host driver 130 of the parallel accelerated processor 125 through the mapping without intervention of the virtual machine monitor 115. In such implementations, a scheduler included in the parallel accelerated processor 125, as further described above in conjunction with FIG. 1, receives the guest request 305 from the virtual function 110 without involvement by the virtual machine monitor 115. In various implementations, firmware executing on the computing device 100 maps resources of the parallel accelerated processor 125 to virtual resources for the virtual function 110, with the firmware directing virtual resources identified by the virtual function 110 to corresponding resources of the parallel accelerated processor 125 to transmit the guest request 305 from the virtual function 110 to the host driver 130 of the parallel accelerated processor 125. In other implementations, the virtual function 110 transmits the guest request 305 to the virtual machine monitor 115, which transmits the guest request 305 to the host driver 130.

Figure 4:
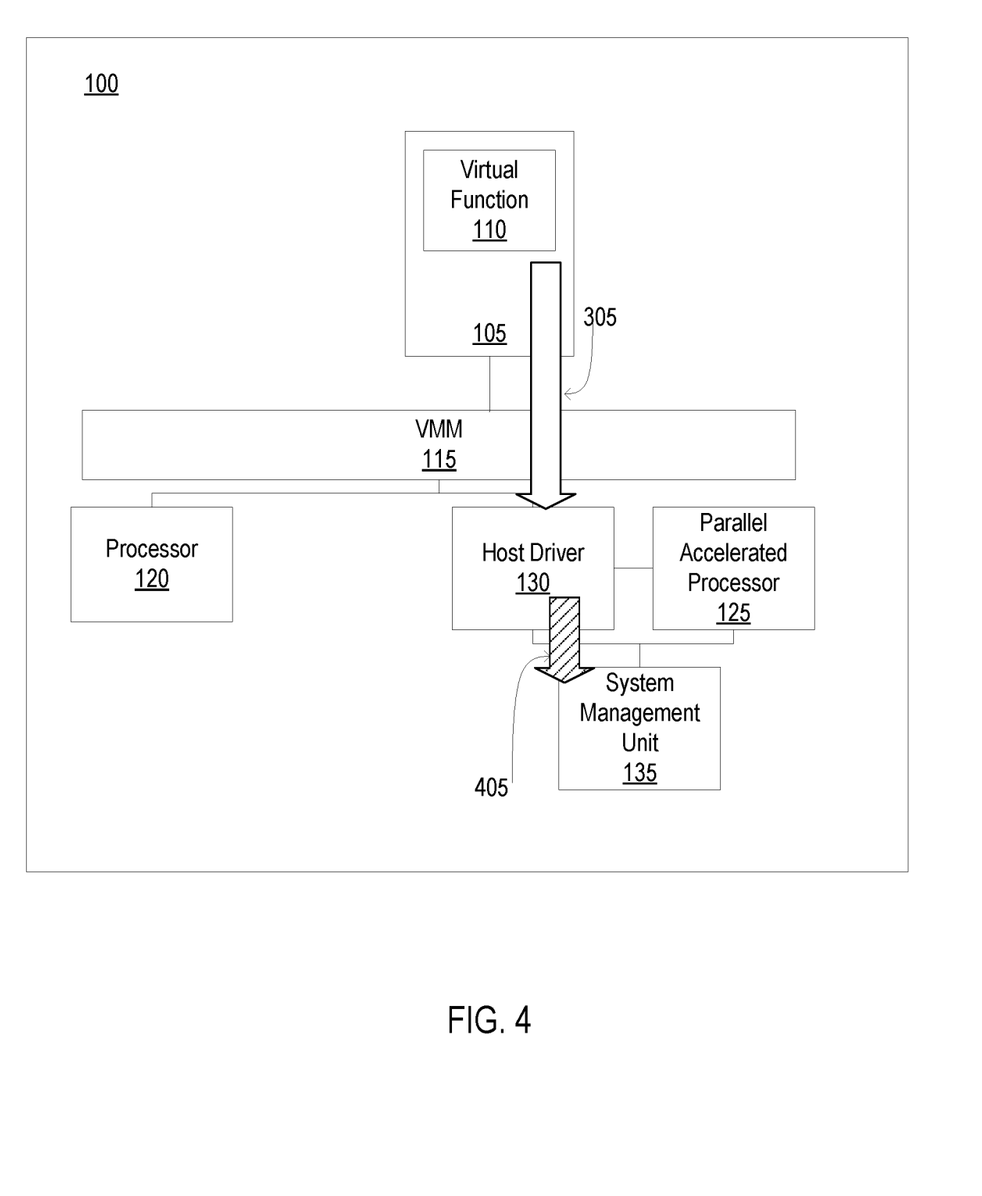
FIG. 4 is part of a process flow diagram of a virtual machine requesting one or more power management metrics of a parallel accelerated processor according to some implementations.

In FIG. 4, the host driver 130 for the parallel accelerated processor 125 transmits a host request 405 to the system management unit 135 of the computing device 100 in response to receiving the guest request 305 from the virtual machine 105. In some implementations, the host driver 130 transmits the host request 405 to the system management unit 135 in response to host driver 130 determining the guest request 305 satisfies one or more criteria, allowing the host driver 130 to limit when the host request 405 is transmitted. For example, the host driver 130 transmits the host request 405 to the system management unit 135 in response to a type of the guest request 305 not matching one or more specific types. As an example, a type of the guest request 305 identifies a type of action the guest request 305 seeks to perform or a type of information the guest request 305 seeks to obtain, and the host driver 130 does not transmit the host request 405 in response to the guest request 305 having one or more specific types, while the host driver 130 transmits the host request 405 in response to the guest request 305 having a type other than the one or more specific types. In a specific example, the host driver 130 does not transmit the host request 405 in response to the guest request 305 being a request to change a voltage of the parallel accelerated processor 125.

In some implementations, the host request 405 includes an identifier of the virtual function 110 corresponding to the guest request 305 or includes other information capable of identifying the virtual function corresponding to the guest request 305. The host driver 130 extracts the identifier of the virtual function 110 from the guest request 305 for inclusion in the host request 405 in some implementations. Further, in some implementations, the host request 405 includes an identifier of the host driver 130, allowing the host request 405 to include information for the system management unit 135 that the host request 405 is from the host driver 130.

Figure 5:
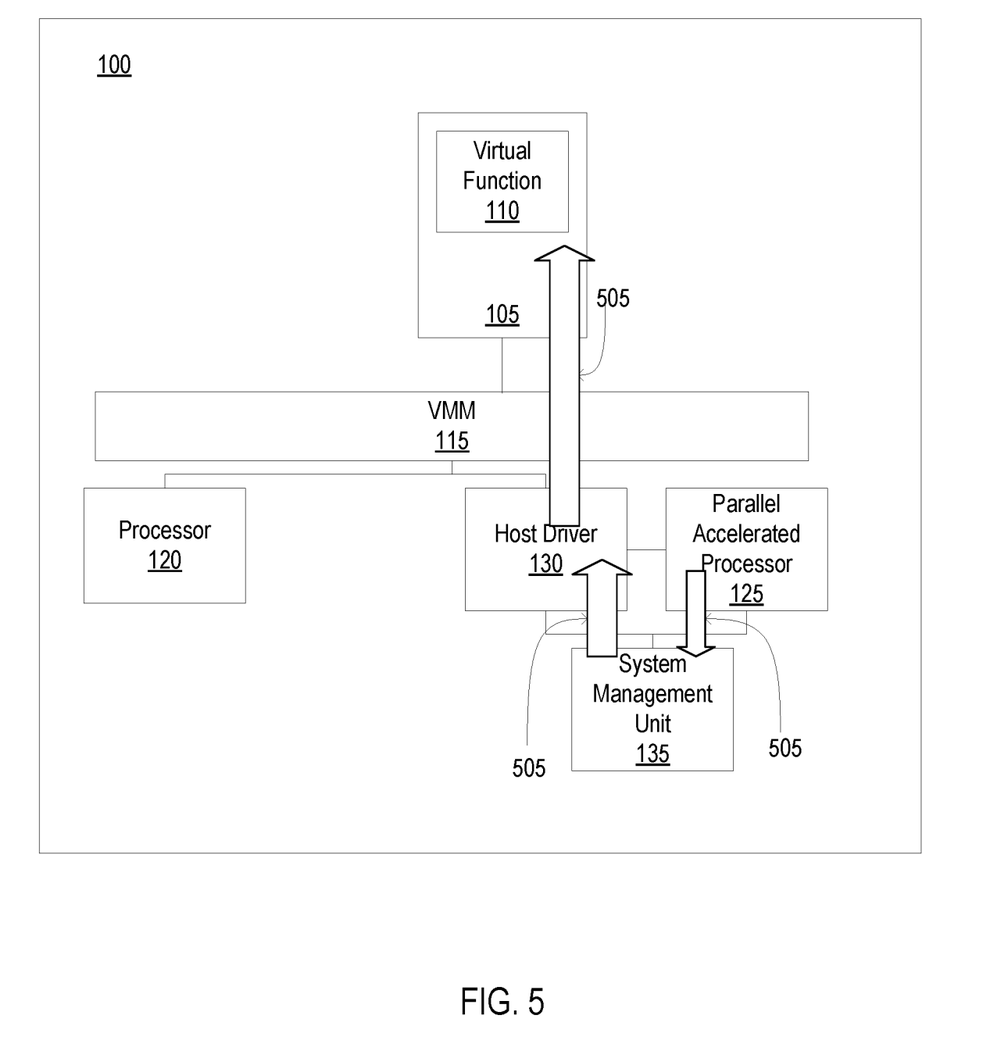
FIG. 5 is part of a process flow diagram of a virtual machine requesting one or more power management metrics of a parallel accelerated processor according to some implementations.

As shown in FIG. 5, in response to receiving the host request 405 from the host driver 130, the system management unit 135 retrieves the one or more power management metrics 505 from the parallel accelerated processor 125. As further described above in conjunction with FIG. 1, example power management metrics 505 include a frequency of the parallel accelerated processor 125, an engine clock of the parallel accelerated processor 125, power usage of the parallel accelerated processor 125, a temperature of the parallel accelerated processor 125, a rate of utilization of the parallel accelerated processor 125, and other suitable information describing operation of the parallel accelerated processor 125. In some implementations, the one or more power management metrics 505 correspond to usage of the parallel accelerated processor 125 by the virtual function 110 from which the host driver 130 received the guest request 305 in FIG. 3. The system management unit 135 extracts an identifier of the virtual function 110 from the host request 405 to obtain the one or more power management metrics 505 for the virtual function 110 in some implementations, while in other implementations the system management unit 135 determines an identifier of the virtual function 110 from content comprising the host request 405. In other implementations, the one or more power management metrics 505 describe power usage (or other operating characteristics) of the parallel accelerated processor 125 at a point in time when the system management unit 135 obtained the one or more power management metrics 505. In another implementation, the one or more power management metrics 505 describe usage of the parallel accelerated processor 125 by a currently active function (e.g., a particular virtual function) being executed by the parallel accelerated processor 125 when the system management unit 135 obtained the one or more power management metrics 505.

The system management unit 135 transmits the one or more power management metrics 505 to the host driver 130, and the host driver 130 transmits the one or more power management metrics 505 to the virtual machine 105. In various implementations, the host driver 130 transmits the one or more power management metrics 505 to the virtual function 110 of the virtual machine 105 from which the guest request 305 was received. In various implementations, wherein the power management metrics 505 are transmitted to the virtual machine 105 identified by the identifier that was included in the host request 405. The host driver 130 includes the identifier of the virtual function 110 from which the guest request 305 was received along with the one or more power management metrics 505 when transmitting the one or more power management metrics 505 to the virtual machine 105 identified by the identifier in various implementations. Hence, the host driver 130 allows a virtual function 110 to obtain the one or more power management metrics 505 without allowing other virtual functions 110 to access the one or more power management metrics 505. Additionally, as the host driver 130 transmits the host request 405 to the system management unit 135, the host driver 130 is capable of validating guest requests 305 before transmitting a host request 405 for the one or more power management metrics 505, increasing security by preventing the virtual function 110, which may not be trusted, from directly accessing the system management unit 135.

Figure 6:
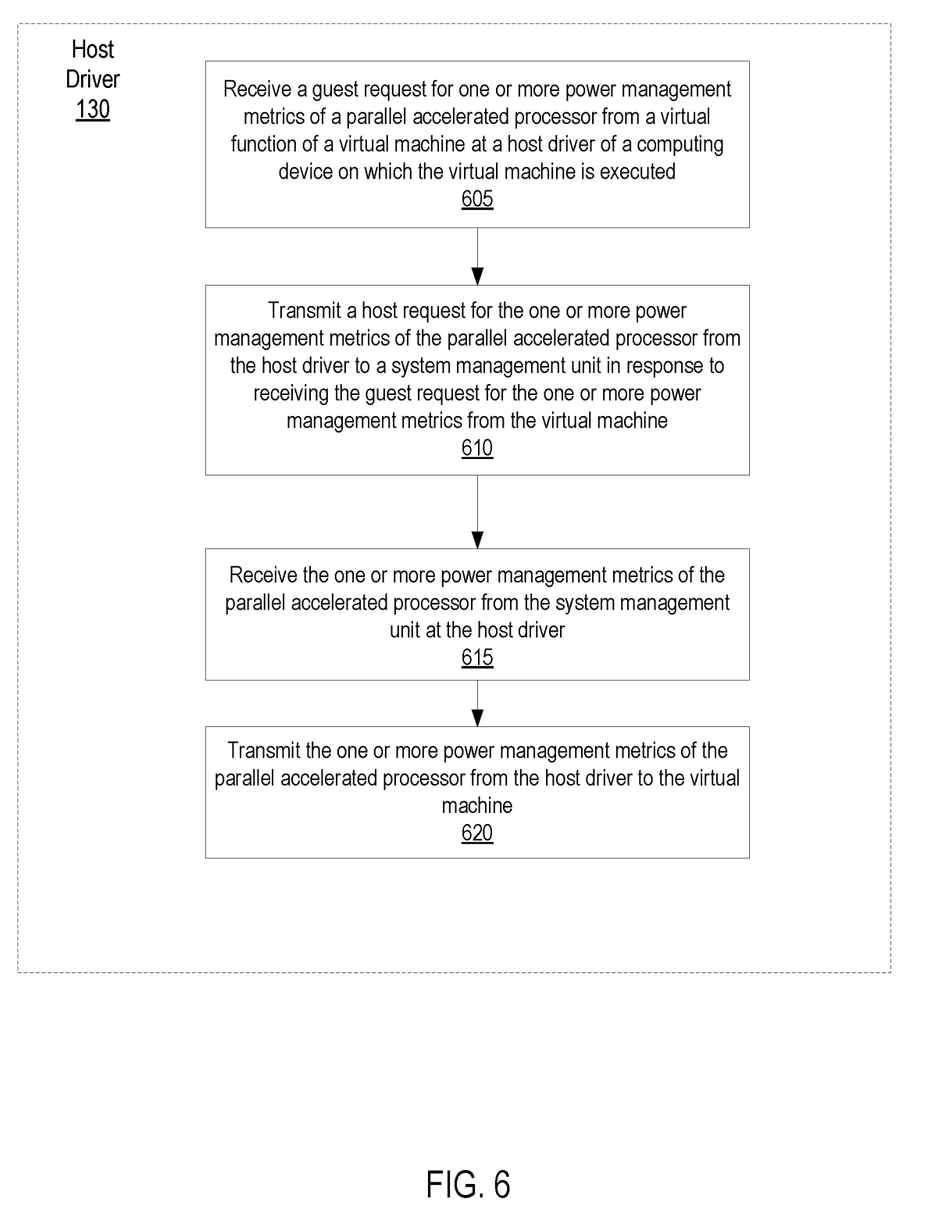
FIG. 6 is a flow chart illustrating an example method for a virtual machine obtaining one or more power management metrics of a parallel accelerated processor according to some implementations.

For further explanation, FIG. 6 sets forth a flow chart illustrating an example method for a virtual machine 105 obtaining one or more power management metrics 505 of a parallel accelerated processor 125. In various implementations, the steps of the method described in conjunction with FIG. 6 are performed by a host driver 130 of the parallel accelerated processor 125 of a computing device 100 on which the virtual machine 105 is executed. The host driver 130 receives 605 a guest request 305 for one or more power management metrics 505 of the parallel accelerated processor 125 from a virtual function 110 of a virtual machine 105, as further described above in conjunction with FIGS. 1 and 2. In response to receiving 605 the guest request 305, the host driver 130 transmits 610 a host request 405 for the one or more power management metrics 505 of the parallel accelerated processor 125 from the host driver 130 to a system management unit 135 of the computing device 100, as further described above in conjunction with FIG. 4. In various implementations, the host request 405 includes an identifier of the virtual function 110 or other information capable of identifying the virtual function 110.

The host driver 130 receives 615 the one or more power management metrics 505 of the parallel accelerated processor 125 from the system management unit 135 and transmits 620 the one or more power management metrics 505 of the parallel accelerated processor 125 from the host driver 130 to the virtual machine 105, as further described above in conjunction with FIG. 5. In some implementations, the one or more power management metrics 505 are for the virtual function 110 from which the guest request 305 was received. In other implementations, the one or more power management metrics 505 are current power management metrics describing power usage (or other operating characteristics) of the parallel accelerated processor 125 at a point in time when the system management unit 135 obtained the one or more power management metrics 505. In another implementation, the one or more power management metrics 505 describe usage of the parallel accelerated processor 125 by a currently active function (e.g., a particular virtual function) being executed by the parallel accelerated processor 125 when the system management unit 135 obtained the one or more power management metrics 505.

In view of the explanations set forth above, readers will recognize that leveraging a host request for one or more power management metrics for a parallel accelerated processor from a host driver allows a virtual function from a virtual machine to obtain the power management metrics without directly accessing a system management unit. Further, the host driver is capable of determining whether to transmit the host request to the system management unit for the virtual function based on one or more characteristics of the virtual function, allowing the host driver to limit when the virtual function can obtain the one or more power management metrics. Hence, a virtual function is capable of obtaining the power management metrics, while security of the system management unit is preserved by the virtual function not directly exchanging data with the system management unit.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A device comprising:
one or more processors;
one or more parallel accelerated processors;
a system management unit configured to monitor the one or more parallel accelerated processors and to obtain one or more power management metrics for a parallel accelerated processor; and
a memory including instructions that, when executed by a processor of the one or more processors, implement a host driver configured to communicate with the system management unit, the host driver further configured to:
receive a guest request for one or more power management metrics of the parallel accelerated processor from a virtual function of a virtual machine executing on the device;
transmit a host request for the one or more power management metrics from the host driver to the system management unit in response to receiving the guest request for the one or more power management metrics;
receive the one or more power management metrics from the system management unit at the host driver; and
transmit the one or more power management metrics from the host driver to the virtual machine.

2. The device of claim 1, wherein the host request includes an identifier of the virtual function.

3. The device of claim 2, wherein the host driver determines the identifier of the virtual function from data included in the guest request.

4. The device of claim 2, wherein the power management metrics are transmitted to the virtual-machine function identified by the identifier.

5. The device of claim 1, wherein transmit the host request for the one or more power management metrics from the host driver to the system management unit in response to receiving the guest request for the one or more power management metrics comprises:
transmit the host request from the host driver to the system management unit in response to the host driver determining the guest request satisfies one or more criteria.

6. The device of claim 5, wherein the one or more criteria include a type of the guest request not matching one or more specific types.

7. A method comprising:
receiving a guest request for one or more power management metrics of a parallel accelerated processor from a virtual function of a virtual machine at a host driver of a computing device on which the virtual machine is executed;
transmitting a host request for the one or more power management metrics of the parallel accelerated processor from the host driver to a system management unit in response to receiving the guest request for the one or more power management metrics from the virtual machine;
receiving the one or more power management metrics of the parallel accelerated processor from the system management unit at the host driver; and
transmitting the one or more power management metrics of the parallel accelerated processor from the host driver to the virtual machine.

8. The method of claim 7, wherein the host request includes an identifier of the virtual function.

9. The method of claim 8, wherein the identifier of the virtual function is included in the guest request.

10. The method of claim 8, wherein the host driver determines the identifier of the virtual function from data included in the guest request.

11. The method of claim 8, wherein the power management metrics are transmitted to the virtual function identified by the identifier.

12. The method of claim 7, wherein transmitting the host request for the one or more power management metrics from the host driver to the system management unit in response to receiving the guest request for the one or more power management metrics from the virtual machine comprises:
transmitting the host request from the host driver to the system management unit in response to the host driver determining the guest request satisfies one or more criteria.

13. The method of claim 12, wherein the one or more criteria include a type of the guest request not matching one or more specific types.

14. The method of claim 7, wherein the one or more power management metrics comprise one or more current power management metrics of the parallel accelerated processor.

15. The method of claim 7, wherein the one or more power management metrics include one or more power management metrics for a currently active function being executed by the parallel accelerated processor.

16. The method of claim 7, wherein the one or more power management metrics include one or more power management metrics for the virtual function.

17. A computer program product comprising a non-transitory computer readable storage medium having instructions encoded thereon that, when executed by a processor, cause the processor to:
receive a guest request for one or more power management metrics of a parallel accelerated processor from a virtual function of a virtual machine at a host driver of a computing device on which the virtual machine is executed;
transmit a host request for the one or more power management metrics of the parallel accelerated processor from the host driver to a system management unit in response to receiving the guest request for the one or more power management metrics from the virtual machine;

receive the one or more power management metrics of the parallel accelerated processor from the system management unit at the host driver; and transmit the one or more power management metrics of the parallel accelerated processor from the host driver to the virtual machine.

18. The computer program product of claim 17, wherein transmitting the host request for the one or more power management metrics from the host driver to the system management unit in response to receiving the guest request for the one or more power management metrics from the virtual machine comprises:

transmit the host request from the host driver to the system management unit in response to the host driver determining the guest request satisfies one or more criteria.

19. The computer program product of claim 18, wherein the one or more criteria include a type of the guest request not matching one or more specific types.

20. The computer program product of claim 18, wherein the power management metrics are transmitted to a virtual function identified by an identifier in the host request.

* * * * *